May 2, 1944.  R. M. OLIVER  2,347,962

HYDRAULIC DECELEROMETER

Filed March 17, 1942

INVENTOR
Robert M. Oliver
BY
ATTORNEY

Patented May 2, 1944

2,347,962

UNITED STATES PATENT OFFICE 2,347,962

HYDRAULIC DECELEROMETER

Robert M. Oliver, Reno, Nev., assignor to The Westinghouse Air Brake Company, Wilmerding, Pa., a corporation of Pennsylvania Application March 17, 1942, Serial No. 435,115

8 Claims. (Cl. 264—1)

This invention relates to hydraulic decelerometers and has particular relation to hydraulic decelerometers for detecting variations in the rate of rotative deceleration of a rotary member, such as the wheel of a vehicle, for a desired purpose.

It is an object of my present invention to provide a novel hydraulic decelerometer which is simple and sturdy in construction and positive in operation.

Figure 1:
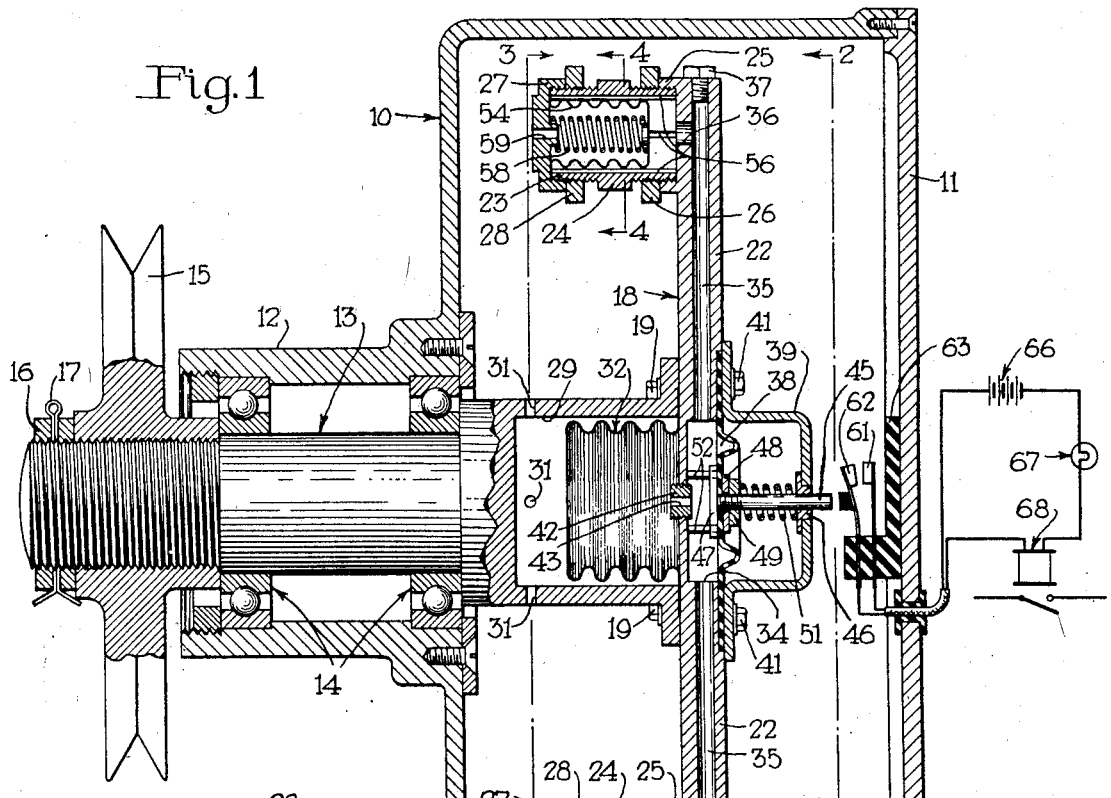
Figure 4:
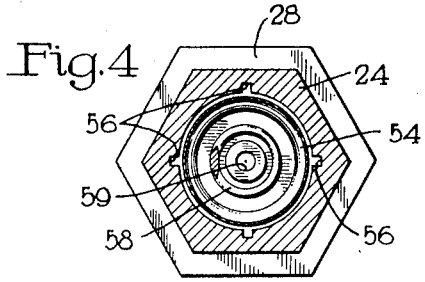
Figure 2:
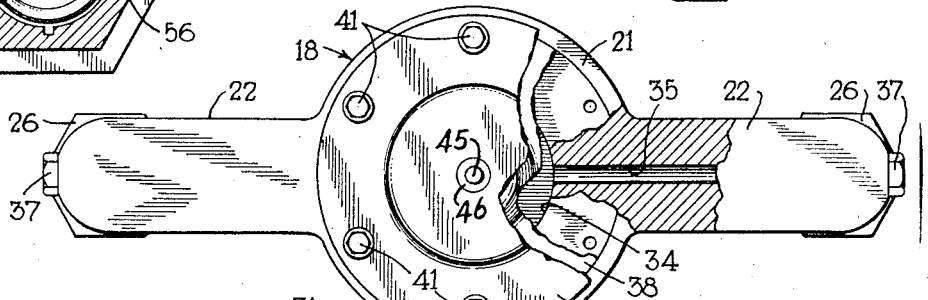
Figure 3:
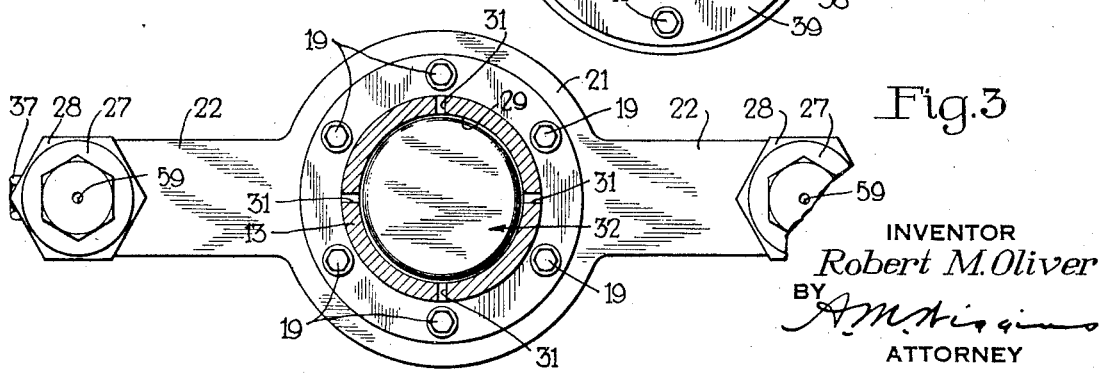

Other objects of my invention will be made apparent in the subsequent description of my invention when read in connection with the accompanying drawing wherein Fig. 1 is a horizontal sectional view, showing details of construction of my novel hydraulic decelerometer, Fig. 2 is a view, taken along the line 2—2 of Fig. 1 showing further details of construction, and Figs. 3 and 4 are sectional views taken respectively on the line 3—3 and 4—4 of Fig. 1 showing other details of construction.

Description

The hydraulic decelerometer which I have devised comprises a tubular casing 10, preferably cylindrical in form. A cover 11, secured as by screws, closes the opening at one end of casing 10 and a hub portion 12 of reduced diameter is formed at the opposite end of the casing. A shaft or spindle 13 is rotatably mounted in the hub 12, as by a pair of axially spaced ball-bearing elements 14, and has a grooved pulley or pulley-wheel 15 secured to the exterior end thereof in any suitable manner. As shown, shaft 13 has an outer threaded portion on which the pulley 15 is screwed and held in position by a nut 16 having a cotter pin 17 for locking the nut in position.

The shaft 13 is arranged to be rotated in accordance with the rotation of a rotary member, such as a wheel and axle unit of a railway car, by means of an endless belt (not shown) engaging the pulley 15 and a similar pulley (not shown) on the rotary member or axle of the wheel unit. In the case of a wheel and axle unit, the pulley 15 is preferably smaller than the pulley on the axle in order that the shaft 13 may be rotated at a higher speed having a desired ratio to axle speed, such as a two-to-one or three-to-one ratio.

The shaft 13 extends into the chamber formed within the casing 10 and a casing member 18 is secured thereto as by a plurality of screws 19 extending through a radial flange on the end of the shaft 13 into suitably tapped holes in the casing member 18.

The casing member 18, as shown in Figs. 2 and 3, comprises a central cylindrical portion 21 and a plurality of arms 22, illustrated as two in number and extending radially outward in diametrical relation to each other.

Each of the arms 22 has a tubular member 23 secured to the outer end thereof. For purposes of illustration, the tubular members 23 are shown as having externally threaded portions at opposite ends thereof and a central portion of hexagonal contour to act as a nut whereby to screw the tubular members into suitable internally threaded cylindrical projections 25 extending laterally from one face of each of the arms.

In order to lock the tubular members 23 to the arms, a suitable nut 26 is provided on the threaded end of the tubular member adjacent the arm.

The outer end of each of the tubular members 23 is provided with a cap nut 27 screwed thereon and locked in position by lock nut 28.

The end of the shaft 13 to which the casing member 18 is secured has a bore 29 which is constantly open to the interior of the casing 10, and thus to atmospheric pressure, through a plurality of ports 31. Contained within the bore 29 is a "Sylphon" or flexible bellows 32, conforming closely in diameter to the diameter of the bore 29, the end of the bellows adjacent the bottom of the bore 29 being closed and the opposite end of the bellows being open and provided with a suitable radially extending flange which is clamped between the casing member 18 and the flange at the end of the shaft 13 in sealed relation.

The central cylindrical portion 21 of the casing member 18 has a circular bore 34 therein which is open at the outer face of the member 18. In each of the arms 22 there is a passage 35 which opens at its inner end into the bore 34 and at its outer end through a suitable port 36, into the interior of the corresponding tubular member 23. The outer open ends of the passages 35 are tapped and closed by screw plugs 37 for a purpose which will be made apparent presently.

Closing the open end of the cylindrical bore 34 in the casing member 18 is a flexible diaphragm 38 of rubber or other suitable material. Diaphragm 38 is secured in sealed relation to the outer face of the casing member 18 by means of a cup-shaped cover 39 having a peripheral flange through which securing bolts or screws 41 extend into threaded or tapped bores in the casing member 18.

The interior of the bellows 32 and the cylindrical bore 34 in the casing member 18 are separated by the wall of the casing member 18 and communication is provided therebetween by a choke-fitting 42 secured in the wall and having a restricted port 43 of selected flow area.

Secured at the center of the diaphragm 38 is a plunger or stem 45 which extends through a suitable guide bushing 46 in the end of the cover 39 into the chamber formed within the casing 10. The plunger 45 may take the form of a bolt having a head 47 disposed within the bore 34 of the casing and a partly threaded stem which extends through a perforation in the diaphragm 38, a suitable lock-washer 48 and nut 49 being provided for securing the bolt to the diaphragm in sealed relation.

A coil spring 51 is interposed in concentric surround-relation to the stem 45 between the nut 49 and the guide bushing 46 on the cover 39 for biasing the diaphragm 38 in the left-hand direction to a position determined by the engagement of stop lugs 52 attached to the head 47 of the bolt with the wall of the casing member at the bottom of the bore 34.

A "Sylphon" or flexible bellows 54 is contained within each of the tubular members 23, the bellows having a diameter conforming closely to the inner diameter of the tubular member. The end of the bellows 54 adjacent the arm of the casing member 18 is closed. The other end of the bellows is open and provided with a suitable flange that is secured in clamped relation between the outer end of the tubular member and the cap nut 27 in sealed relation. The interior surface of each tubular member 23 is provided with a plurality of longitudinally extending pressure equalizing grooves 56, the purpose of which will be hereinafter fully explained.

A coil spring 58 is contained within each of the bellows 54 in interposed relation between the closed end of the bellows and the inner face of the cap screw 27 closing the outer end of the tubular member 23 and urges the bellows toward the condition of maximum expansion. The interior of the bellows is open to atmosphere through a suitable port 59 in the cap screw to enable the free contraction and expansion of the bellows.

Associated with the plunger 45 carried by the diaphragm 38 is a switch device comprising two normally separated flexible contact fingers 61 and 62 supported by an insulating member 63 suitably attached to the inner surface of the cover 11 screwed to the casing member 10. The contact finger 62 is engaged by plunger 45 and bent in the right-hand direction into contact with the contact member 61 in response to shifting of the plunger 45 in the right-hand direction a sufficient degree in the manner and under the circumstances hereinafter to be described.

The switch device including the contacts 61 and 62 may be employed for any desired control purpose. I have illustratively shown the switch device including the contacts 61 and 62 in connection with a simple circuit including a battery 66, a signal lamp 67 and an electrical relay 68. As will be readily apparent, the signal lamp will be illuminated and the relay will be picked up whenever the switch contacts 61 and 62 are in engagement.

A suitable fluid of relatively high density or specific gravity, such as mercury, is poured into the open end of one of the passages 35 when the plug 37 at that end is removed. Enough mercury is poured into the open passage 35 to substantially fill the interior of the bellows 32, cylindrical bore 34 in the casing member 18, as well as the passages 35 and the connected portions within the tubular members 23, after which the plug 37 is screwed tightly into the open end of the passage 35 to close it. The decelerometer may not be entirely filled with mercury but some air may be permitted to be trapped with the mercury for a reason hereafter explained.

Upon rotation of the shaft 13, the centrifugal force acting on the mercury in the passages 35 and the cylindrical bore 34 causes the mercury to exert a hydraulic pressure on the closed ends of bellows 54 within the tubular members 23, thereby compressing the bellows in opposition to the reactionary force of a coil spring 58. The pressure equalizing grooves 56 in the tubes 23 permit the escape of mercury from between the folds of the bellows 54 so that the contraction of the bellows is not interfered with, delayed or prevented. A partial vacuum or sub-atmospheric pressure is thus produced in the cylindrical bore 34 so that the mercury within the bellows 32 is expelled by the atmospheric pressure acting on the exterior of the bellows through ports 31, through the restricted port 43 in the choke fitting 42 into the cylindrical bore 34 and then outwardly through both of the passages 35 in the arms 22, the amount of mercury expelled from the bellows 32 depending upon the degree of compression of the several bellows 54, which in turn depends upon the speed of rotation of the shaft 13.

The sub-atmospheric pressure in the cylindrical bore 34 is ineffective to cause inward movement of the diaphragm 38 because the engagement of stop lugs 52 with the wall of the casing member 18 prevents this.

Upon the rotative deceleration of the shaft 13, the centrifugal force of the mercury in the passages 35 and in the cylindrical bore 34 reduces in proportion to the square of the instantaneous angular velocity or rotational speed of the shaft 13. A differential is accordingly created between the instantaneous reactionary force of the springs 58 within the bellows 54 and the instantaneous centrifugal force of the mercury, which differential is effective to displace mercury from the tubular members 23 and to cause the return of such displaced mercury reversely back through the passages 35 to the chamber 34. The grooves 56 in the tubular members 23 permit the mercury to flow promptly into the spaces between successive folds of the bellows 54 so that expansion of the bellows is not inhibited or delayed.

The size of the restricted port 43 in the choke fitting 42 is so selected with respect to the volume of the tubular members 23 and the strength of the springs 58 and 51 as to limit the rate of return of mercury displaced from the tubular members 23 to the chamber 34 to the bellows 32 to a controlled rate. If the rate at which mercury is displaced from the tubular members 23 does not exceed the controlled rate at which the mercury can flow through the restricted port 43 to the bellows 32, the differential between the instantaneous reactionary force and centrifugal force of the mercury will not rise above a certain value.

The spring 51 associated with the diaphragm 38 is so designed as to prevent outward flexing of the diaphragm and a consequent movement of plunger 45 to effect engagement of the switch contact fingers 61 and 62 as long as the differential force on the mercury in the chamber 34 does not exceed the said certain value.

If the rate at which mercury is displaced from the tubular members 23 to the chamber 34 exceeds the controlled rate of return of mercury through the restricted port 43 to the bellows 32, the differential between the instantaneous reactionary force of the springs 58 and the centrifugal force of the mercury builds-up in chamber 34 to a value exceeding said certain value. The degree to which the differential rises above the said certain value is determined by the degree of difference in the rate of displacement of mercury from the tubular members 23 and the rate of return of mercury through the port 43 to the bellows 32. Thus, whenever the force of the mercury in the chamber 34 exceeds said certain value, spring 51 is overcome and diaphragm 38 flexed outwardly to cause engagement of the switch contact fingers 61 and 62.

The volume of mercury displaced from the tubular members 23 when the shaft 13 reduces from a higher to a lower speed is equal to the difference between the total volume in the tubular members 23 at the higher speed and the total volume in the tubular members 23 at the lower speed. The volume in the tubular members 23 is proportional to the square of the angular velocity or rotational speed of the shaft 13 because the volume in the tubular members is directly proportional to the centrifugal force of the mercury and the centrifugal force is, in turn, proportional to the square of the angular velocity or rotational speed of the shaft 13.

Due to the variation in the volume in the tubular members 23 according to the square of the rotational speed of the shaft 13, it will be seen that the volume of mercury displaced from the tubular members 23 for a given amount of reduction in speed of rotation of the shaft 13 is greater at the higher speed ranges than at the lower speed ranges. Thus, assuring a total volume of mercury in the tubular members 23 of 100 cubic inches at a rotational speed of shaft 13 of 3,600 R. P. M., a reduction of 36 R. P. M. from the speed of 3,600 R. P. M. results in a displacement of approximately two cubic inches of mercury from the tubular members. On the other hand, a reduction of 36 R. P. M. from a speed of rotation of the shaft 13 of 1,800 R. P. M. results in a displacement of only one cubic inch of mercury from the tubular members.

It follows, therefore, that in order for the rate of displacement of mercury from the tubular members 23 to be the same at 3,600 R. P. M. and 1,800 R. P. M., respectively, the rate of rotative deceleration of the shaft 13 must be twice as great at 1,800 R. P. M. as at 3,600 R. P. M. It follows also that in order for a sufficient differential to be created between the instantaneous reactionary force of springs 58 and the centrifugal force of the mercury to effect engagement of switch contact fingers 61 and 62, the rate of rotative deceleration of the shaft 13 must be twice as great at 1,800 R. P. M. as at 3,600 R. P. M. For any given speed of rotation of the shaft 13, however, there is a certain corresponding rate of rotative deceleration of the shaft 13 above which the rate of displacement of mercury from the tubular members 23 exceeds the rate of return of mercury to the bellows 32 through the restricted port 43 in the choke fitting 42. Consequently, while my decelerometer is not sensitive to a uniform rate of rotative deceleration of the shaft at all speeds of the shaft 13, it is nevertheless operatively sensitive to a range of rates of rotative deceleration of the shaft 13. The utility of my decelerometer for certain uses, such as the detection of the slipping condition of a vehicle wheel, is thus not impaired.

As long as shaft 13 continues to rotatively decelerate at a rate exceeding the certain rate corresponding to the instantaneous rotational speed of the shaft 13, the contact fingers 61 and 62 will be maintained in engagement with each other, thereby causing the illumination of the indicating lamp 67 and pick-up of the relay 68.

When the rate of rotative deceleration of the shaft 13 reduces below the certain rate corresponding to a given instantaneous speed of rotation of the shaft 13, the differential between the reactionary force of the springs 58 and the centrifugal force of the mercury is insufficient to overcome the force of the spring 51, so that diaphragm 38 and plunger 45 are accordingly restored in the left-hand direction to the normal position thereof in which the switch contact fingers 61 and 62 are disengaged and the circuit of the signal lamp 67 and relay 68 correspondingly interrupted.

When my decelerometer is rotated in accordance with the rotational speed of a wheel and axle unit of a railway car, it is effective to detect the slipping condition of the wheels due to excessive braking. As is well known, when the brakes associated with vehicle wheels are applied to a degree sufficient to overcome the adhesion or rolling friction between the wheels and the road surface or rails, the wheels decelerate at an abnormally rapid rate to a locked condition and slide. Sliding of wheels, particularly railway wheels, is objectionable because less braking effect is exerted on the vehicle by a sliding wheel than by a rolling wheel and because of the development of flat spots on the wheels necessitating repair or replacement of the wheels.

It is well known that rotative deceleration of railway car wheels at a rate exceeding that corresponding to a rate of retardation of a car of ten miles per hour per second is a positive indication of the slipping condition of the wheels. The term "slipping condition" as employed herein refers to the rotation of a vehicle wheel at a speed different from a speed corresponding to vehicle speed at a given instant, as distinguished from the term "sliding condition" which refers to the locked condition of the wheel.

My hydraulic decelerometer is, therefore, adapted to detect the slipping condition of vehicle wheels merely by selecting a suitable flow area for the restricted port 43 of the choke fitting 42 with relation to the volume of the tubular members 23 and the strength of the springs 58 and 51. The size of the port 43 in the choke fitting 42 may be so selected that the rotative deceleration of the shaft 13 at a rate corresponding to retardation of the car at ten miles per hour per second while the shaft is rotating at a maximum speed corresponding for example, to one hundred miles per hour travel of the car, will cause engagement of the contact fingers 61 and 62. For lower rotational speeds of the shaft 13, such as a speed corresponding to travel of the car at fifty miles per hour, a correspondingly higher rate of rotative deceleration of the shaft 13 will be required, as previously explained, in order to cause engagement of the switch contact fingers 61 and 62.

However, since the rotative deceleration of the shaft 13 at a rate corresponding to retardation of the car at ten miles per hour per second is a positive indication of slipping of the wheels, it will be apparent that rotative deceleration of the car wheels at any rate higher than ten miles per hour per second, such as twenty, thirty or forty miles per hour per second, is an even more positive indication of the slipping condition of the wheels. The fact that my hydraulic decelerometer is operatively sensitive to different rates of rotative deceleration at different rotational speeds of the shaft 13 accordingly does not interfere with the utilization of the device as a means for detecting the slipping condition of vehicle wheels.

I have for simplicity omitted brake control apparatus from the drawing, but it will be apparent that the relay 68 may be readily employed to initiate operation of suitable brake control equipment so as to effect a rapid reduction in the degree of application of the brakes associated with slipping vehicle wheels whereby to cause the wheels to be restored to vehicle speed before reducing in speed to a locked or sliding condition. It is possible to employ suitable known brake control equipment which requires only the momentary closure of the switch contacts 61 and 62 to initiate an operating cycle including the rapid reduction in the degree of the application of the brakes and a subsequent reapplication of the brakes, independently of the continued engagement of the switch contacts as the slipping wheels are accelerated back toward vehicle speed.

As previously stated, the hydraulic medium employed in my decelerometer device may be any liquid of high density or specific gravity, such as mercury. When mercury is employed, however, those parts of the device touched by mercury, such as the bellows 32 and 54, tubular members 23 and the casing member 18, must be of a material such as steel, nickel, nickel steel alloys or certain molded or plastic materials which are not adversely affected or corroded by mercury. Since rubber is not adversely affected by mercury, the diaphragm 38 may be made of rubber without being adversely affected although it may of course be made of other material, such as metal, which is not adversely affected by mercury.

It will be apparent that some air may advantageously be contained with the mercury, as previously indicated, in order that expansion of the mercury caused by an increase in ambient temperature may take place without so increasing the outward pressure on the diaphragm 38 as to cause undesired engagement of the switch contact fingers 61 and 62. However, if the passages 35, chamber 34 and tubular members 23 are completely filled with mercury the bellows 32 will readily accommodate the increased volume of mercury caused by an increase in ambient temperature without causing an undesired operation of the switch contact fingers 61 and 62.

Having now described my invention, what I claim as new and desire to secure by Letters Patent, is:

1. A device comprising a rotary member containing a supply of liquid of relatively high density, a resiliently expansible chamber carried by said rotary member and arranged in a manner to receive liquid from the rotary member so as to be expanded according to the degree of the centrifugal force exerted by the liquid upon rotation of the rotary member and effective to exert a reactionary force on the liquid, means for controlling the rate of return of liquid from said expansible chamber to said rotary member effected when the rotary member reduces in speed, said rate controlling means being such as to cause at least a predetermined force to be exerted on the liquid being returned to said rotary member corresponding to the instantaneous differential between the reactionary force of the expansible chamber and the centrifugal force of the liquid when the rate of displacement of liquid from said expansible chamber exceeds the rate at which said rate controlling means permits liquid to be returned to the rotary member, and pressure responsive means subject to the force exerted thereon by the liquid being returned to the rotary member and operatively responsive only to a force exceeding said certain predetermined differential force.

2. A device comprising a rotary member having a first chamber and a plurality of expansible chambers disposed radially outwardly with respect to said first chamber and communicating therewith, said first chamber and said expansible chambers containing a liquid of relatively high density which is impelled radially outwardly from said first chamber to cause expansion of the expansible chambers in accordance with the degree of the centrifugal force exerted on the liquid upon rotation of said rotary member, resilient means yieldingly opposing the expansion of said expansible chambers and effective to exert a reactionary force on the liquid, means for controlling the rate of return flow of liquid to said first chamber from said expansible chambers when the rotary member reduces in speed whereby to create at least a predetermined differential force on the liquid being returned to said first chamber corresponding to the instantaneous difference between the reactionary force and the centrifugal force on the liquid whenever the rate of displacement of liquid from the expansible chambers exceeds the rate of return of liquid to said first chamber permitted by said rate controlling means, and means subject to the force exerted thereon by the liquid being returned to said first chamber and operatively responsive only to a force exceeding said certain differential.

3. A device comprising a rotary member having a hub portion and a plurality of radially extending arms, said hub portion having an inner chamber therein and each of said arms having an outer chamber disposed radially outwardly with respect to said inner chamber and communicating therewith, movable abutment means in each of said outer chambers, said inner chamber and outer chambers containing liquid of relatively high density which is impelled radially outward from said inner chamber to the outer chambers in response to the centrifugal force exerted on the liquid upon rotation of the rotary member, resilient means associated with each of said abutments and yieldingly opposing the movement of the abutment to enlarge the volume of the corresponding outer chamber in response to the centrifugal force exerted by the liquid and exerting a reactionary force on the liquid tending to cause the return of the liquid from said outer chambers to said inner chamber upon the reduction in speed of the rotary member, means for controlling the rate of return of liquid to said inner chamber in such manner that when the rate of displacement of liquid from the outer chambers resulting from the reduction in speed of the rotary member exceeds the rate of return flow of liquid to said inner chamber permitted by the rate controlling means, at least a certain differential pressure is exerted on the liquid being returned to said inner chamber corresponding to the instantaneous differential between the reactionary force of the resilient means and the centrifugal force of the liquid, and means subject to the force exerted thereon by the liquid being returned to said inner chamber and operatively responsive only to a force exceeding said predetermined differential.

4. A device comprising a rotary member having a first chamber, a second chamber, means providing a restricted communication between said first and said second chamber, a plurality of additional chambers disposed radially outwardly with respect to said first and said second chambers and communicating with said second chamber, all of said chambers containing a liquid of relatively high density, movable abutment means associated with each of said additional chambers and effective upon movement to vary the volume of said additional chambers, resilient means acting on each of said abutments in a manner biasing it to a normal position of minimum volume for the corresponding additional chamber and yieldable in response to the centrifugal force of the liquid exerted on the abutment during rotation of the rotary member to permit the volume of the corresponding additional chamber to be enlarged correspondingly and to receive liquid impelled out of said first and said second chambers, said means providing restricted communication between said first and said second chambers being effective to so restrict the rate of return flow of the liquid from said additional chambers to said first chamber upon a reduction in the speed of rotation of the rotary member that when the rate of displacement of liquid from the additional chambers exceeds the rate of return flow of liquid to said first chamber at least a certain differential force corresponding substantially to the instantaneous difference between the reactionary pressure of the resilient means on the liquid and the centrifugal force of the liquid is exerted on the liquid in said second chamber, and pressure responsive means subject to the force of the liquid in said second chamber and operatively responsive only to a force exceeding said certain differential force.

5. A device comprising a rotary member having a first chamber adjacent the axis of rotation of the rotary member and a plurality of resiliently expansible chambers disposed radially outwardly with respect to said first chamber, said first chamber and said expansible chambers containing a liquid of relatively high density which is impelled radially outwardly from said first chamber and exerts a force varying according to the centrifugal force of the liquid effective to cause expansion of the expansible chambers upon rotation of the rotary member, resilient means yieldingly opposing the expansion of said expansible chambers and exerting a reactionary force tending to displace liquid from said expansible chambers back to said first chamber upon a reduction in the speed of rotation of the rotary member, means for so controlling the rate of return flow of liquid to said first chamber in response to a reduction in speed of the rotary member as to cause at least a certain differential force to be exerted on said liquid being returned to said first chamber corresponding to the instantaneous differential between the reactionary force of said resilient means and centrifugal force of the liquid whenever the rate of displacement of liquid from said expansible chambers exceeds the rate of return of liquid to said first chamber permitted by said rate controlling means, and pressure responsive means subject to the force of the liquid being returned to said first chamber and operatively responsive only to a force exceeding said predetermined differential force.

6. A device comprising a rotary shaft having a first chamber; a casing member having a central hub portion attached to said shaft and a plurality of arms radially extending from said hub portion, said hub portion having a second chamber and each of said arms having at the outer end thereof an additional chamber communicating with said second chamber; a bellows carried within the said first chamber in said shaft; means providing a restricted communication between the interior of said bellows and the said second chamber in the hub portion of said casing member; a bellows in each of said additional chambers the interior of which bellows is open to atmosphere and the exterior of which is subject to the pressure in the corresponding additional chamber; spring means within each of the last said bellows for yieldingly opposing the contraction thereof in response to pressure exerted on the exterior surface thereof; said first mentioned bellows, said chamber in the hub portion of said casing member and said additional chambers containing a liquid of relatively high density which is impelled radially outwardly to exert a force on the exterior of the bellows in said additional chambers corresponding to the centrifugal force exerted by the liquid; said spring means exerting a reactionary force on the liquid in said additional chambers tending to cause liquid to be displaced from said additional chambers and returned to said first mentioned bellows in response to the reduction in the speed of the rotary shaft; the said means providing restricted communication between the interior of the first mentioned bellows and the said second chamber in the hub portion of the casing member so controlling the rate of return flow of liquid to the first mentioned bellows as to cause at least a certain differential force to be exerted on the liquid in said second chamber corresponding to the instantaneous differential between the reactionary force of the spring means associated with the bellows in said additional chambers and the centrifugal force of the liquid whenever the rate of displacement of liquid from said additional chambers exceeds the rate of return flow of liquid through said restricting means to said first mentioned bellows, and pressure responsive means subject to the force of the liquid in said second chamber and operatively responsive only to a force exceeding said certain differential force.

7. A device comprising a rotary member having a first chamber adjacent the axis of rotation of the rotary member and a resiliently expansible chamber disposed radially outwardly with respect to said first chamber, said first chamber and said expansible chamber containing a supply of liquid of relatively high density whereby said expansible chamber is expanded in varying degree according to the centrifugal force of the liquid exerted upon rotation of the rotary member and at the same time exerts a reactionary force on the liquid tending to return the liquid from said expansible chamber to the said first chamber, means for so restricting the rate of return of liquid from said expansible chamber to said first chamber upon a reduction in rotational speed of said rotary member as to cause at least a certain differential force to be created on the liquid being returned to said first chamber and corresponding to the instantaneous differential between the reactionary force exerted by said expansible chamber on the liquid and the centrifugal force of the liquid whenever the rate of displacement of liquid from the expansible chamber exceeds the rate of return flow of liquid through said restricting means to said first chamber, pressure responsive means subject to the force of liquid being returned to said first chamber and operatively responsive only to a force exceeding said certain differential force, and non-rotative control means actuated by said pressure responsive means.

8. A device for detecting variations in the rate of change of speed of a rotary element, comprising a rotary member rotatable according to the rotational speed of the rotary element, said rotary member having a resilient contractible chamber adjacent the axis of rotation thereof and a resilient expansible chamber in radially spaced relation to said contractible chamber and communicating therewith, said chambers containing a quantity of liquid at relatively high density which is shifted from the contractible chamber to the expansible chamber in response to centrifugal force occurring upon an increase in the speed of the rotary member and which is shifted from the expansible chamber to the contractible chamber in response to a reduction in the speed of the rotary member, choke means interposed in the communication between said contractible and expansible chambers for limiting the flow of liquid between said chambers to a controlled rate whereby to produce variations in the pressure of the liquid being supplied to said expansible chamber and returned to said contractible chamber upon variation in the rate of change of speed of the rotary member, and means operatively responsive to such variations in the pressure of the liquid.

ROBERT M. OLIVER.